United States Patent Office 3,806,558
Patented Apr. 23, 1974

3,806,558
DYNAMICALLY PARTIALLY CURED THERMOPLASTIC BLEND OF MONOOLEFIN COPOLYMER RUBBER AND POLYOLEFIN PLASTIC
William K. Fischer, Woodbury, Conn., assignor to Uniroyal, Inc., New York, N.Y.
No Drawing. Filed Aug. 12, 1971, Ser. No. 171,328
Int. Cl. C08f 41/12
U.S. Cl. 260—897 A            13 Claims

ABSTRACT OF THE DISCLOSURE

Thermoplastic dynamically partially cured blends of monoolefin copolymer rubber (such as EPM or EPDM rubber) with a polyolefin resin (such as polypropylene, polyethylene) exhibit good physical properties and are reprocessable. The dynamic partial cure of the blend is effected by heating the blend with a curative such as a peroxide while shearing the blend. The blends are elastomeric and are used to make molded or extruded articles which have good physical properties without requiring vulcanization.

---

Commonly assigned copending application Ser. No. 108,225, filed Jan. 20, 1971, discloses thermoplastic blends of partially cured monoolefin copolymer rubber and polyolefin plastic.

This invention relates to a thermoplastic elastomeric blend and a method of making same.

Thermoplastic elastomers, which can be processed and fabricated by methods used for thermoplastics and do not require vulcanization to develop elastomeric properties, are known (see, for example, U.S. Pat. 3,265,765, Holden et al., Aug. 9, 1966; also Hartman et al., "Butyl Grafted to Polyethylene Yields Thermoplastic Elastomer," Rubber World, October 1970, pp. 59–64). Conventionally these materials have been made by special block copolymerization or polymer grafting methods. The present invention is based on the discovery that thermoplastic elastomeric compositions can be made by dynamically semi-curing blends of certain rubbers and resins.

Blends of monoolefin copolymers with polyolefins have been known (e.g. U.S. Pats. 3,256,366 Corbelli et al., June 14, 1966 and 3,456,038 Newman et al., July 15, 1969; British Pat. 1,043,078, Phillips Petroleum Co., Sept. 21, 1966; Canadian Pats. 789,074, Brender et al., July 2, 1968 and 792,277, Schreiber, Aug. 13, 1968; Belgian Pat. 731,950, Sumitomo Chemical Co., Oct. 23, 1969, etc.), but those blends have not had the characteristics of thermoplastic elastomers.

The present invention is based on the discovery that a thermoplastic blend having highly desirable characteristics is provided by a dynamically partially cured blend of rubber in admixture with a resin. More particularly, the invention is based on a dynamically partially cured blend of monoolefin copolymer rubber and polyolefin plastic, which blend is thermoplastic and can be fabricated by such methods as molding and extrusion, into shaped articles, which do not require a vulcanization step to develop good physical properties. The invention thus provides thermoplastic elastomers which can be molded or otherwise shaped without necessity for performing an expensive and time-consuming vulcanization step in the shaped article. Furthermore the blends can be reprocessed, just like a typical thermoplastic material.

In accordance with the invention a blend of the monoolefin copolymer rubber, typified by saturated EPM (ethylene-propylene copolymer rubber) or unsaturated EPDM (ethyl-propylene-non-conjugated diene terpolymer rubber), with a polyolefin resin, typified by polyethylene or polypropylene, is partially cured by the action of a conventional curing agent while masticating the mixture. The curing conditions are such that the cure of the blend is only partial, that is, the blend is not cross-linked to the state where it becomes almost entirely insoluble in the usual solvents for the uncured blend. It has been found that a blend of monoolefin rubber with a polyolefin plastic, which has thus been partially cured or cross-linked under dynamic conditions, provides a thermoplastic material having the herein described unusual combination of desirable characteristics.

In carrying out the invention the blend of monoolefin copolymer rubber component and polyolefin plastic is mixed with a small amount of curative, and subjected to curing conditions while working the mixture dynamically. The amount of curative and the curing conditions are so selected as to produce only a partial cure as evidenced by conventional tests suitable for determining the degree of cure or cross-linking of a polymer, such as various solubility and swelling tests, including conventional gel determinations, tests for cross-link density, tests for combined sulfur when sulfur cures are used, and the like. Another method for determining a partial state of cure is to observe whether the material processes on a mill to form a continuous band or whether it fails to knit, which would indicated over-curing.

The monoolefin copolymer rubber employed in the blend of the invention is an essentially amorphous, random, elastomeric copolymer of two or more monoolefins, with or without at least one copolymerizable polyene. Usually two monoolefins are used, but three or more may be used. Ordinarily one of the monoolefins is ethylene while the other is preferably propylene, frequently in weight ratio of from 80:20 to 20:80. However, other alpha-monoolefins may be used including those of the formula $CH_2=CHR$ where R is an alkyl radical having for example 1 to 12 carbon atoms (e.g., butene-1, pentene-1, hexene-1, 4-methyl-pentene-1, 5-methylhexene-1, 4-ethylhexene-1, etc.). While the monoolefin copolymer rubber may be a saturated material, as in ethylene-propylene binary copolymer rubber ("EPM" it is ordinarily preferred to include in the copolymer a small amount (e.g., 2–20% by weight) of at least one copolymerizable polyene to confer unsaturation on the copolymer. Although conjugated dienes such as butadiene or isoprene may be used for this purpose (British Pat. 983,437; Belgian Pat. 736,717, Sumitomo Chemical Co., Jan. 29, 1970), in practice it is usual to employ a nonconjugated diene, including the open-chain nonconjugated diolefins such as 1,4-hexadiene (U.S. Pat. 2,933,480 Gresham et al., Apr. 19, 1960) or a cyclic diene, especially a bridged ring cyclic diene, as in dicyclopentadiene (U.S. Pat. 3,221,709, Adamek et al., Oct. 12, 1965), or an alkylidenenorbornene as in the methylenenorbornene or ethylidenenorbornene (U.S. Pat. 3,151,173, Nyce, Sept. 29, 1964), as well as cyclooctadiene, methyltetrahydroindene, etc. (see also such U.S. Pats. as 3,093,620 and 3,093,621; also 3,538,192 col. 6, line 49 to col. 7, line 51). The polyenes employed are not limited to those having only two double bonds, but include those having three or more double bonds. Blends based on unsaturated terpolymer rubber (EPDM") have the most advantageous properties and are highly preferred.

The polyolefin resin with which the monoolefin copolymer rubber is mixed to make the blend of the invention is a solid, high molecular weight resinous plastic material made by polymerizing such olefins as ethylene, propylene, butene-1, pentene-1, 4-methylpentene, etc., in conventional manner. Thus, such crystalline polyolefins as polyethylene (either of the low density [e.g., .910–.925 g./cc.], medium density [.926–.940 g./cc.] or high density [e.g., .941–.965 g./cc.] may be used, whether prepared by high pressure processes or low pressure processes, including linear polyethylene. Polypropylene is a preferred polyolefin plastic, having highly crystalline isotactic and syndiotactic forms. Frequently the density of polypropylene is from .800 to .980 g./cc. Largely isotactic polypropylene having a density of from 0.900 to 0.910 g./cc. may be mentioned particularly. Crystalline block copolymers of ethylene and propylene (which are plastics distinguished from amorphous, random ethylene-propylene elastomers) can also be used. Included among the polyolefin resins are the higher alpha-olefin modified polyethylenes and polypropylenes (see "Polyolefins," N. V. Boenig, Elsevier Publishing Co., N. Y., 1966).

The relative proportions of monoolefin copolymer rubber and polyolefin plastic employed in the blends of the invention may vary widely, for example from 50 to 90 parts (preferably 60 to 80 parts) by weight of at least one mono-olefin copolymer rubber and correspondingly 50 to 10 parts (preferably 40 to 20) of at least one polyolefin plastic, depending on the characteristics desired in the blends. Such blends containing a major proportion of the mono-olefin copolymer rubber have an elastomeric character.

As indicated, an important feature of the invention resides in masticating or shearing while semi-curing the blend of the monoolefin copolymer rubber with the polyolefin plastic. For this purpose any conventional curative may be employed, including such free radical generating agents or cross-linking agents as the peroxides, whether aromatic or aliphatic as in the aromatic diacyl peroxides and aliphatic diacyl peroxides, dibasic acid peroxides, ketone peroxides, alkyl peroxyesters, alkyl hydroperoxides, e.g., diacetylperoxide, dibenzoylperoxide, bis-2,4-dichloro benzoyl peroxide, ditert.-butyl peroxide, dicumylperoxide, tert.-butylperbenzoate, tert.-butylcumyl peroxide, 2,5-bis-(tert.-butylperoxy)-2,5-dimethylhexane, 2,5-bis-(tert.-butylperoxy)-2,5-dimethylhexyne-3; 4,4',4'-tetra-(tert.-butylperoxy)-2,2-dicyclohexylpropane, 1,4-bis-(tert.-butylperoxy-isopropyl)-benzene, 1,1 - bis - (tert.-butylperoxy)-3,3,5-trimethylcyclohexane, lauroyl peroxide, succinic acid peroxide, cyclohexanone peroxide, tert.-butyl peracetate, butyl hydroperoxide, etc. Also suitable are the azide types of curing agents including such materials as the azidoformates [e.g., tetramethylenebis (azidoformate); for others see U.S. Pat. 3,284,421, Breslow, Nov. 8, 1966], aromatic polyazides (e.g., 4,4'-diphenylmethane diazide; for others see U.S. Pat. 3,297,674, Breslow et al., Jan. 10, 1967), and sulfonazides such as p,p'-oxybis (benzene sulfonyl azide), etc. Other curatives that may be used include the aldehydeamine reaction products such as formaldehyde-ammonia, formaldehyde-ethylchloride-ammonia, acetaldehyde-ammonia, formaldehyde-aniline, butyraldehyde-aniline, heptaldehyde-aniline, heptaldehyde-formaldehyde - aniline, hexamethylenetetramine, alpha - ethyl-beta-propylacrolein-aniline; the substituted ureas (e.g., trimethylthiourea, diethylthiourea, dibutylthiourea, tripentylthiourea, 1,3-bis (benzothiazolyl-mercaptomethyl) urea, and N,N-diphenylthiourea]; guanidines (e.g., diphenylguanidine, di-o-tolylguanidine, diphenylguanidine phthalate, and di-o-tolylguanidine salt of dicatechol borate); xanthates (e.g., zinc ethylxanthate, sodium isopropylxanthate,, butylxanthic disulfide, potassium isopropylxanthate, and zinc butylxanthate); dithiocarbamates (e.g., copper, dimethyl-, zinc dimethyl-, tellurium diethyl-, cadmium dicyclohexyl-, lead dimethyl-, selenium dibutyl-, zinc pentamethylene-, zinc didecyl-, and zinc isopropyl-octyl-dithiocarbamate); thiazoles [e.g., 2-mercaptobenzothiazole; zinc mercaptothiazolyl mercaptide, 2-benzothia--zolyl-N,N-diethylthiocarbamyl sulfide, and 2,2'-dithiobis-(benzothiazole)]; imidazoles (e.g., 2-mercaptoimidazoline and 2-mercapto-4,4,6-trimethyl-dihydropyrimidine); sulfenamides [e.g., N-t-butyl-2-benzothiazole-, N-cyclohexyl-benzothiazole-, N,N-diisopropyl-benzothiazole-, N-(2,6-dimethylmorpholino)-2-benzothiazole-, and N,N-diethyl-benzothiazole-sulfenamide]; thiuramdisulfides (e.g., N,N'-diethyl-, tetrabutyl-, N,N'-diisopropyldioctyl-, tetrameth-yl-, N,N'-dicyclohexyl, and N,N'-tetralaurylthiuramdisul-fide); also paraquinonedioxime, dibenzoparquinonedioxime, etc. as well as sulfur itself (see Encyclopedia of Chemical Technology, vol. 17, 2nd edition, Interscience Publishers, 1968; also Organic Peroxides, Daniel Severn, vol. 1, Wiley-Interscience, 1970). The peroxide curative may be used alone, or in conjunction with the usual auxiliary substances such as sulfur, maleimides including bismaleimides, poly-unsaturated compounds (e.g., cyanurate), acrylic esters (e.g., trimethylolpropanetrimethacrylate), etc. When using sulfur as a curative (whether elementary sulfur itself or sulfur in the form of a sulfur donor), it is usually desirable to include an accelerator of sulfur vulcanization as well as an activator (e.g., a metal salt or oxide), as in conventional practice. Mixed peroxide-type or mixed sulfur-type curing systems may be employed if desired such as dicumylperoxide plus 2,5-bis-(tert.-butylperoxy) - 2,5 - dimethylhexane or sulfur plus tetramethylthiuramdisulfide. The preferred monolefin copolymers having residual unsaturation, conferred by the presence of a polyene, such as EPDM, afford the widest choice of curatives. Reference may be had to "Vulcanization and Vulcanizing Agents," W. Hoffman, Palmerton Publishing Co., New York, 1967, for an extensive disclosure of curing agents.

In accordance with the invention, the amount of cure or cross-linking imparted to the blend under dynamic conditions is only partial, as distinguished from a full or substantially complete cure or cross-linking. As indicated, various tests for cure or degree of cross-linking may be applied, one of the more convenient tests being the content of gel or insoluble material. For purposes of the invention, the gel content of the dynamically semicured or partially cross-linked blend should be substantially in excess of the gel content of the blend without the partial curing step. Thus, the gel content of the partially cured blend, measured in cyclohexane, will ordinarily be at least 10% greater than the gel content of the uncured blend, preferably at least 20%, and more preferably at least 30% greater than the gel content of the uncured blend (i.e., the same blend processed in the absence of curative). Ordinarily the gel content of the blend as dynamically semicured for purposes of the invention will be at least 45% but not more than 96% in cyclohexane. In many cases the gel content, in cyclohexane, of the dynamically partially cured rubber preferably falls within the range of from 60% to 93%. The gel is of course the portion of the blend that is insoluble in the specified solvent, in this case cyclohexane, and is conveniently measured by immersing a sample of the material in the solvent for 48 hours at 73° F., taking an aliquot of the solution and determining the concentration of solute by evaporating the solvent. It will be understood that with other solvents at other temperatures, the gel value of a particular sample may be different. Thus, measured in boiling xylene the gel values of the present dynamically semi-cured blend would ordinarily be very much lower (e.g., 30–50% lower) than the given gel values in cyclohexane at 73° F. It will be understood that in the case of blends containing filler, the gel value is obtained by calculating the percentage of gel on the weight of the original sample minus the filler therein, i.e., the gel value is the percent of insoluble polymer, based on the total weight of polymer in the sample.

The polymer blend formed as a result of the described cross-linking treatment typically has a much lower swelling index than is found in the original, untreated monoolefin copolymer rubber-polyolefin resin blend. Typically the percent swell in cyclohexane as a result of the present dynamic semicure is at least 8% less usually 10% to 70% less, than the percent swell of the original nontreated blend. Ordinarily the percent swell of the dynamically semicured blend is within the range of from 2% to 15%, preferably from 2% to 10%. (Percent gel and percent swell are elucidated in more detail in U.S. Pat. 3,012,020, Kirk et al., Dec. 5, 1961.)

The desired dynamic semicure of the blend of monoolefin copolymer rubber and polyolefin plastic is brought about by mixing the rubber and plastic with a small amount of the curing or cross-linking agent, and subjecting the mixture to curing conditions while shearing or masticating the blend. It will be understood that the curing or cross-linking parameters (viz., the amount of curing agent, the curing temperature, the curing time) will be so selected as to produce a partial or semi-cure rather than a full or substantially complete cure. Thus, in many cases use of less than ⅔, or use of less than ½, and in some cases ¼ or less, of the amount of curative conventionally required for full cure, is capable of producing the desired degree of partial cure in the blend, as evidenced by the development of a gel content in cyclohexane within the described range. Such gel content is distinguished from values of 100% gel content (in cyclohexane) displayed by the blend even before it is fully cured. Fully cured or cross-linked blend is almost entirely insoluble even in boiling xylene. It will also be understood that blends cured to a state such that the gel exceeds 96% in (cyclohexane at 73° F.) will not form a continuous sheet on a mill, that is, they are not processable materials within the scope of the instant invention.

To effect the dynamic semicure, the rubber, plastic, and curing agent mix may be worked on an open roll mill, or in an internal mixer (such as a Banbury mixer, an extruder-mixer or a transfer mixer). Frequently, working at a mixer temperature of from about 160° to about 550° F., preferably 240-550° F., and more preferably 270-450° F., for about 3-20 minutes is sufficient to bring about the desired dynamic semi-cure.

As in conventional curing practice, in selecting a curing temperature for use with any given curative it is appropriate to consider the decomposition temperature or activation temperature of the curing agent. As a practical rule of thumb, the effective activation temperature may be taken as the temperature at which at least 95% of the curative has been decomposed to yield free radicals within a .5 minute time period. It is preferable to select a curative having an activation temperature above the softening (crystalline melting) point of the polyolefin plastic (about 270° F. in the case of high density polyethylene; 335° F. in the case of polypropylene). However, it is also possible to use a curing agent having an activation temperature at or below the softening point of the polyolefin plastic. The activation temperature would ordinarily be above 240°, preferably above 270° F. The maximum activation temperature would ordinarily not be more than 550° F., preferably not higher than 450° F. Data on the common peroxide curatives, 2,5-bis(tert.-butylperoxy)-2,5-dimethylhexane ("Peroxide I") and dicumyl peroxide ("Peroxide II"), are given in the following table:

| Temp., °F. | Half-life in toluene | | Remarks |
|---|---|---|---|
| | Peroxide I | Peroxide II | |
| 240 | 21 hours | 10.2 hours | Preheating temp. in examples. |
| 270 | 2 hours | 1.75 hours | M.P. of H.D. polyethylene. |
| 335 | Ca. 5 minutes | Ca. 3 minutes | M.P. of polypropylene. |
| 360 | 47 seconds | 22 seconds | |
| 390 | 7.2 seconds | 3.6 seconds | |
| | 4 minutes.[1] | 1½ minutes.[1] | |

[1] Time to about 95% decomposition at 360° F.

The dynamic partial cross-linking treatment substantially exhausts the action of the curing agent so that there is little or no tendency for further advancement of cure to take place subsequently. Ordinarily, heating and working of the rubber-plastic-curative mix for a period of time equal to at least four half-lives of the peroxide or other curative is desirable. It is sometimes desirable to insure termination of the action of any remaining cross-linking agent, by adding to the mix, at the end of the dynamic partial curing step, a small amount of a free-radical scavenging agent, such as a stabilizer or antioxidant. Such stabilizer may be added and mixed in for the last minute or so of mastication. The dynamically semicured material may be subjected to one or more "refining" passes on a mill, and the stabilizer or antioxidant may be added in the course of or just prior to said refining. Any conventional antioxidant or stabilizer may be used, including, by way of nonlimiting examples, amine types, phenolic types, sulfides, phenyl alkanes, phosphites, etc. Representative materials are listed in "Rubber: National and Synthetic," Stern, Palmerton Publishing Co., New York, 1967, especially at pages 244-256; see also "Chemistry and Technology of Rubber," Davis & Blake, Reinhold, New York, 1937, chapter XII. Included are such materials as 2,2-4-trimethyl-1,2-dihydroquinoline, diphenylamine acetone condensate, aldol alpha-naphthylamine, octylated diphenylamine, N-phenyl-N'-cyclohexyl-p-phenylene diamine, 2,6-di-tert.-butyl-4-methyl phenol, styrene-resorcinol resin, o-cresol monosulfide, di-p-cresol-2-propane, 2,5-di-tert.-amyl hydroquinone, dilauryl-3,3'-thiodipropionate and similar dialkyl thiodipropionates, etc.

The thus dynamically partially cross-linked blend may be tested for gel content in cyclohexane and/or for processability (band formation on a mill). Such tests will reveal whether the blend has received insufficient cross-linking on the one hand (gel content too low; percent swell high) or too much cross-linking on the other hand (gel content too high; inability to form a band on a tightly closed low-friction mill in spite of considerable refining). One or two preliminary tests on a small trial batch will usually suffice to establish a proper amount of a particular curing agent to employ with a specific blend under a given set of dynamic precuring conditions. Appropriate manipulation of the variables may be made in any given case to produce a satisfactory result, using the working examples below as a guide.

It will be understood that care will be taken to limit the degree of cure, either by using reduced amount of curative and/or reduced duration or severity of the curing conditions, so that the blend does not become completely cross-linked but remains at least partially soluble and thermoplastic, as distinguished from an insoluble, thermoset, blend cured to a gel content of above 96% (in cyclohexane) which is no longer processable. The time required for the dynamic partial cure will vary with such factors as the particular polymers employed, the kind and amount of curative, and the temperature at which the partial cure is carried out, as well as other factors such as the size of the batch, the character of the shearing device employed, etc. In general the time is inversely related to the temperature and concentration of curative.

The dynamically semicured blend is a thermoplastic, processable material as evidenced by the fact that it knits together to form a continuous sheet or band on a roll mill. In some cases where the degree of semi-cure has been relatively high, it may be necessary to break the material down slightly by milling, before it will band. Thus, if the blend has a gel content in cyclohexane somewhat in excess of 96%, it may sometimes be broken down by milling until the gel content is not more than 96%, making it suitable for use in the invention. If the cure has gone beyond the point where the material can be broken down and made processable, the material is not suitable.

The mixing temperature should be sufficient to soften the plastic and form a uniform mix. Pigments, fillers, stabilizers, lubricants, u.v. screening agents, or other appropriate compounding or modifying ingredients may be included in the blend if desired. The blend of the invention provides a noteworthy combination of processability (including the ability to be reprocessed repeatedly) with good physical characteristics. The good physical characteristics include properties heretofore usually associated only with vulcanized or thermoset (not reprocessable) materials, notably low permanent set. The blends of the invention accordingly afford a way of producing thermoformed shaped objects (e.g., by extrusion, injection or compression molding) which combines the convenience and speed of thermoplastic shaping with certain physical characteristics of thermoset or vulcanized elastomers.

Heretofore, certain desirable characteristics such as low permanent set have largely been obtainable only in vulcanized elastomers which required the molder to use a rather long dwell time in the mold to effect vulcanization. The vulcanized flash or scrap could not be reprocessed. On the other hand, thermoplastic materials could be molded rapidly and scrap could be re-processed, but certain physical characteristics such as permanent set were usually rather poor. The present dynamically partially cured blends of monoolefin copolymer rubber and polyolefin plastic combine in one material the advantages of rapid moldability and reprocessability with the advantages of a vulcanizate (low permanent set).

It will be understood that in many plastic and elastomer shaping operations a considerable percentage of scrap is produced. Examples of this are in dieing out parts from extruded, press-molded or calendered sheet and sprues and runners which result from screw-injection molding. Such scrap produced from the blend of the invention may be chopped and re-extruded seven or more times with no significant deterioration in appearance or processing characteristics. The blends, in addition to being reprocessable, have enhanced properties including tensile strength and resistance to compression set, resistance to deterioration in oil, reduced elongation set, and improved resistance to abrasion and flex-cracking.

Useful articles that may be made from the blends of the invention by such methods as extrusion, screw-injection, press molding, calendering and vacuum forming include extruded insulation on wire, gaskets, flexible tubing, balls, weatherstripping, flexible bumpers, etc.

In comparison to a commercially available thermoplastic elastomer which is a butadiene-styrene block copolymer known as Kraton 3125, blends of the invention have higher hardness and, more importantly, much greater retention of hardness when heated to elevated temperatures. Heat deflection upon subjecting to pressure is less for compositions of the invention. The volume change of compositions of the invention after immersion in fuel oil is less.

As indicated, processability, and particularly reprocessability, is an important characteristic of the blends of the invention. The processability of the blends may be evaluated by subjecting samples of the blend to such shaping operations as extrusion, injection molding, or compression molding, as described in the working examples below. Extrusion is the shaping method of choice where long continuous forms, such as hose, window seals, wire coatings, flat sheets, etc. are desired. It is important that the extruded articles have acceptable surface smoothness. In most cases the materials of the invention are well adapted to extrusion methods, although in some cases, particularly where the gel level is on the high side, the extruded surfaces may not be as smooth to the touch as desirable. However, even the blends which are not satisfactorily extrudable can usually be shaped by injection molding. For satisfactory screw injection molding the material must form in the mold a homogeneous article of uniform strength. The flow viscosity characteristics of such blends are adequate to insure filling the mold under the operating conditions. The most highly semicured blends of the invention are ordinarily best shaped by press molding.

The elastomeric character of objects shaped without vulcanization from blends of the invention is perhaps evidenced most strikingly by the low elongation set a break, measured by ASTM D412. In the present preferred elastomeric blends, the elongation set at break is usually improved (i.e., decreased) by at least 30%, preferably by at least 50%. However other physical properties such as tensile strength and ultimate elongation at break are also significant, and the combined effect of these properties is conveniently expressed as a "performance factor," P.F., which is defined as follows:

$$P.F., p.s.i. \times 10^3 = \frac{(\text{Tensile, p.s.i.}) \times (\text{elongation, percent})}{\text{Elongation set at break, percent}}$$

where the tensile strength and the elongation are measured by ASTM D412. As will be manifest from the working examples below, the "performance factor" of blends of the invention is improved (increased) by at least 20%, more frequently by 45%, over the performance factor of otherwise similar blends not dynamically semicured. In highly preferred blends, the performance factor is increased to two or more times its control value.

The reprocessability of the properly stabilized blends of the invention is demonstrated by the fact that blends of the invention have been extruded and re-extruded up to seven times and still retained desirable characteristics.

In many instances it is advantageous to include a lubricant in the dynamically semicured composition of the invention, particularly from the standpoint of improving further the extrusion quality of the composition where this is desired. For this purpose any known lubricant conventionally used in rubber or plastics may be used, preferably in amount of from .2 part or less to 3 parts or more, preferably .5 to 1 part, per 100 parts by weight of the monoolefin rubber plus polyolefin plastic. The lubricant may be added after the dynamic semi-curing step.

The present process differs from that described in copending application Ser. No. 108,225 referred to above in that in said prior application the monoolefin copolymer rubber is first semi-cured and thereafter the semicured copolymer rubber is blended with the polyolefin plastic (that is, the prior process is basically a two-step process), whereas in the present process blending and semi-curing are carried out simultaneously (that is, the present process is basically a one-step process).

Usually the following procedure is applied in carrying out the invention.

(1) The monoolefin copolymer elastomer, the poly-alpha-olefin plastic, the curing agent, and if so desired, filler, are charged at the desired ratio to a suitable mixer such as a Banbury internal mixer, transfer-type extruder-mixer, extruder or any such device that will enable efficient mastication at the desired temperature. Such blending apparatus may be preheated to reduce the time required to reach a processing temperature range, provided that such preheating temperature is below the decomposition temperature of the curing agent used.

(2) While mixing, the temperature is increased to above the decomposition temperature of the curing agent and usually the mix is held at such a temperature, while continuing the mixing, for a time period long enough to ensure at least 95% decomposition of the curing agent, based on its theoretical half life at said temperature, and thorough mixing of the blend.

(3) After having processed the blend to a degree described under (2), an antioxidant is added to the blend and processing is continued usually for one minute or more in order to thoroughly incorporate the antioxidant in the blend for the purpose of deactivating any residual curing agent and enhanced protection against oxidative degradation of the composition.

(4) If so desired the resultant product may be refined on a mill before being used to form shaped articles by means of extrusion, injection molding, press molding or any suitable means of manufacture.

The following examples, in which all quantities are expressed by weight unless otherwise indicated, will serve to illustrate the practice of the invention in more detail.

EXAMPLE 1

A series of blends is compounded, having the compositions indicated in Table I, Parts A and B, following the general procedure described above. Two different monoolefin copolymer rubbers are employed, both unsaturated EPDM's. One EPDM, identified as "EPDM I," contains 47.5% ethylene, 47.5% propylene, and 5% dicyclopentadiene, by weight; the Mooney viscosity is 65 (ML-4 at 250° F.); the gel content is 3% (all gel contents expressed herein, unless otherwise indicated, are measured by immersion in cyclohexane for 48 hours at 73° F.). The other EPDM, "EPDM II," contains 61% ethylene, 35% propylene and 4% 5-ethylidene-2-norbornene; the Mooney viscosity ML-4 at 250° F. is 60, MS-4 at 250° F. is 23; the gel content is 5% with about 70% swell. The polyolefin plastic employed is either polypropylene or polyethylene. One kind of polypropylene, "Polypropylene I," is largely crystalline, isotactic polypropylene, having a melt flow index of 4.0 (ASTM D123–58T, 230° C.), a specific gravity of .903 and 94% gel ("Profax 6523"). "Polypropylene II" has a melt flow index of 0.8 (D–1238-L, 230° C.), a specific gravity of .903 and 99% gel ("Profax 6723"). The polyethylene identified in Table I as "H. D. Polyethylene" is a high density polyethylene having a melt flow index of 0.3 (D1238E, 190° C.) a specific gravity of .956 and 90% gel ("Hifax 4601"). "L. D. Polyethylene" is a low density polyethylene having a melt flow index of 2.0 (D1238, 190° C.) a specific gravity of .919, gel content nil ("DYNH"). In Table I five runs, namely Runs 1, 2, 3, 13 and 15, employ no curative and are outside the invention; these runs serve the purpose of blanks or controls. In the other runs, the cross-linking agent is either a peroxide, or a sulfur curing agent. The identity of the curatives in Table I is as follows: "Peroxide I" is 2,5-bis(tert.-butylperoxy)-2,5-dimethylhexane; it has a half-life at 347° F. of .98 minute; it is employed as a 50% active commercial preparation ("Varox"). "Peroxide II" is dicumyl peroxide; half-life at 338° F. of 1.1 minute (0.4 hour at 212° F.); it is employed as a 40% active commercial preparation ("Di Cup 40"). "Accelerator I" is tetramethylthiuramdisulfide, actually a sulfur donor curative. "Accelerator II" is the curative 4,4'-dithiodimorpholine. To carry out the runs summarized in Table I, the ingredients shown are added to a Banbury internal mixer which has been preheated to about 240° F. Mastication is started, and within about 1 minute the mixer temperature, as read on a chart activated by a thermocouple located on the wall of the mixing chamber, has reached about 360° F. The actual stock temperature, as determined by previous independent measurements, is usually 30–40° higher than the "chart temperature." In these examples, the processing temperature stated is the "chart temperature," which for all practical purposes may be taken as essentially the temperature at the mixer wall itself where the thermocouple which activates the chart indicator is located. Shearing is continued for about 7 minutes at that temperature. At that time the mixing is stopped and 1 part of antioxidant [tris(nonylated phenyl) phosphite] is charged as a free-radical scavenger, after which masticating is resumed for an additional one minute at 360° F.

The resulting dynamically semicured blend is discharged from the Banbury, formed into a sheet on a mill and chopped into pellets for further evaluation.

Portions of the pelletized blends are screw injection molded into test specimens, on which the physical properties are determined by standard test methods with the results shown in Table I. From the tensile strength, ultimate elongation and elongation set at break results, the value termed the "performance factor" as defined above is also calculated for each blend, as indicated in Table I. It will be seen from the data of Table I that remarkable increases in the performance factor are made possible by the practice of the invention.

It will also be seen from Table I that the process of the invention increases the gel content and decreases the swelling index. Also the Mooney viscosity increases. These changes are indicative of partial cure of the blend.

All of the blends of the invention had good injection molding and compression molding characteristics; all had good extrusion characteristics except the products from Runs 4, 9 and 1 which were better adapted to shaping by injection or compression molding. Seemingly only at elevated gel contents extruding became more difficult.

TABLE I

| Run number | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Ingredients (parts): | | | | | | | | | | | | | | | | | | | | |
| EPDM I | 80 | 70 | 60 | 90 | 80 | 80 | 70 | 60 | 80 | 80 | 80 | 80 | 80 | 80 | 80 | 80 | | 80 | 80 | 80 |
| EPDM II | | | | | | | | | | | | | | | | | 80 | | | |
| Polypropylene I | 20 | 30 | 40 | 10 | 20 | 20 | 30 | 40 | 20 | 20 | 20 | | | | | | 20 | 20 | 20 | 20 |
| Polypropylene II | | | | | | | | | | | | 20 | | | | | | | | |
| H.D. polyethylene | | | | | | | | | | | | | 20 | 20 | | | | | | |
| L.D. polyethylene | | | | | | | | | | | | | | | 20 | 20 | | | | |
| TiO₂ | | | | | | | | 25 | | | | | | | | | | | | |
| Hydrated silica | | | | | | | | | | 25 | | | | | | | | | | |
| Carbon black (FEF) | | | | | | | | | | | 25 | | | | | | | | | |
| Peroxide, type | | | | I | II | I | I | I | I | I | I | I | | I | | I | I | | | |
| Peroxide, amount | | | | .9 | .75 | .6 | .6 | .6 | .6 | .6 | .6 | .6 | | .6 | | .6 | .6 | | | |
| Accelerator I | | | | | | | | | | | | | | | | | | 2 | .5 | .5 |
| Accelerator II | | | | | | | | | | | | | | | | | | | .5 | |
| Sulfur | | | | | | | | | | | | | | | | | | | | .2 |
| Processing temp., °F | 360 | 360 | 360 | 360 | 360 | 360 | 360 | 360 | 360 | 360 | 360 | 360 | 360 | 360 | 360 | 360 | 360 | 360 | 360 | 360 |
| Processing period, min | 7 | 7 | 7 | 7 | 7 | 7 | 7 | 7 | 7 | 7 | 7 | 7 | 7 | 7 | 7 | 7 | 7 | 7 | 7 | 7 |
| Gel, percent | 31 | 42 | 53 | | 84 | 76 | | | | | 77 | 45 | | 85 | 46 | 76 | 35 | 51 | 60 | 81 |
| Swell, percent | 13 | 9 | 6 | | 7 | 8 | | | | | 9 | 8 | | 5 | 10 | 7 | 13 | 10 | 11 | 8 |
| ML-5-350° F | 18 | 17 | 19 | | | | | | | | | | 21 | | 23 | | | 29 | 31 | 50 |
| ML-5-375° F | | | | 45 | 23 | 24 | 15 | | 34 | 39 | 38 | 20 | | 32 | | 30 | 23 | | | |
| Tensile strength, p.s.i. | 830 | 1,125 | 1,590 | 390 | 810 | 900 | 1,430 | 1,550 | 1,190 | 600 | 1,120 | 780 | 780 | 1,150 | 240 | 410 | 650 | 810 | 750 | 900 |
| 100% modulus, p.s.i. | 830 | 1,050 | 1,400 | | 610 | 670 | | | 810 | 590 | 900 | 590 | 600 | 1,020 | 230 | 400 | 570 | 800 | 700 | 800 |
| Elongation, percent | 120 | 220 | 430 | 210 | 250 | 200 | 330 | 420 | 210 | 240 | 190 | 270 | 560 | 150 | 590 | 110 | 260 | 160 | 190 | 200 |
| Elongation set at break, percent | 40 | 80 | 200 | 13 | 38 | 25 | 65 | 145 | 13 | 35 | 25 | 53 | 278 | 20 | 258 | 15 | 30 | 40 | 48 | 85 |
| Hardness, Shore A | 75 | 87 | 90 | | 78 | 77 | | | 82 | 83 | 82 | 73 | 69 | 76 | 62 | 67 | 77 | 78 | 78 | 78 |
| Performance factor, p.s.i.×10³ | 2.5 | 3.1 | 3.3 | 6.3 | 5.3 | 7.2 | 7.3 | 4.5 | 19.3 | 4.1 | 8.5 | 4.0 | 1.6 | 8.6 | .75 | 3.0 | 5.1 | 3.2 | 3.0 | 5.1 |

EXAMPLE 2

Runs 21 to 24 summarized in Table II are carried out in the same manner as in Example 1, and indicate the effect of increasing the level of curative. Run 21, which employs no curative, is outside the invention and is included for purposes of comparison. Although the physical properties of all of the dynamically semi-cured compounds of the invention greatly exceed those of the control run 21, beyond a gel content of about 93% no further improvement is achieved in this series.

The extrudability results listed in Table I are determined on a Brabender extruder (Type EX3A, No. 191) under the following conditions: screw compression ratio 2.5/1, screw speed 20 r.p.m., temperature at rear of barrel 375° F., temperature at front of barrel 420° F., die diameter ⅛ inch, temperature of die 440° F. The material is considered extrudable if the extrudate feels smooth to the touch, otherwise it is not; ratings are assigned on a scale from 10 (perfectly smooth) to 0 (unextrudable). Although extrudability of the dynamically semicured blend decreased at the high gel levels (higher peroxide content), even the Run 24 dynamically semicured blend, at 96% gel content, was still press moldable.

TABLE II

| Run number | 21 | 22 | 23 | 24 |
|---|---|---|---|---|
| Ingredients (parts): | | | | |
| EPDM I | 80 | 80 | 80 | 80 |
| Polypropylene I | 20 | 20 | 20 | 20 |
| Peroxide I | | .8 | 1.6 | 2.4 |
| Processing temp., °F | 360 | 360 | 360 | 360 |
| Processing period, minutes | 7 | 7 | 7 | 7 |
| Gel, percent | 34 | 86 | 93 | 96 |
| Swell, percent | 14 | 7 | 4 | 4 |
| ML-5-350° F | 19 | 27 | 30 | 27 |
| Tensile strength, p.s.i. | 680 | 1,040 | 1,320 | 1,210 |
| 100% modulus, p.s.i. | 670 | 720 | 790 | 780 |
| Elongation, percent | 200 | 250 | 220 | 190 |
| Elongation set at break, percent | 50 | 30 | 14 | 13 |
| Hardness, Shore A | 73 | 77 | 78 | 78 |
| Performance factor, p.s.i.×10³ | 2.7 | 8.7 | 21 | 17.7 |
| Extrusion smoothness | 10 | 10 | 9 | 0 |
| Press moldable | Yes | Yes | Yes | Yes |

EXAMPLE 3

The effect of lubricants in improving the extrusion quality of the dynamically semi-crosslinked blend is demonstrated in this example, particularly by comparison of the basic dynamically partially cured polymer blend of Table III prior to addition of lubricant with blends of Table IV after addition of lubricant.

The dynamically partially cured polymer blend, Run 25 in Table III, is prepared in the following manner.

To a Banbury preheated to about 240° F. are charged EPDM I, Polypropylene I, and Peroxide I as previously identified, in the amounts shown in Table III. The blend is masticated for 8 minutes at 350° F., 1 minute at 380° F. and 4 minutes at 390° F. After this dynamic crosslinking, the mixing is stopped and 1 part of an antioxidant (dilaurylthiodipropionate) is added. Shearing is then continued for one additional minute at 390° F. The dynamically partially cured blend is then dropped, milled, sheeted and chopped. Testing gives the results shown in Table III, where the extrusion smoothness is determined by extruding a ⅛ inch rod from a Brabender machine as previously described.

The foregoing partially cured blend, called the Base Polymer in Table IV, is then blended further with lubricant as indicated in Table IV, where Runs 27–32 include lubricant and Run 26, for comparison, does not include lubricant. In Table IV, Lubricant type I may be epoxidized soybean oil, of about 1000 molecular weight, having an oxirane oxygen content of about 6.5% (e.g., "Paraplex G–62" trademark). Lubricant type II may be an ionic ethylene-methacrylic acid copolymer containing 10% methacrylic acid containing uniformly distributed therethrough a metal ion such as sodium (e.g., U.S. Pat. 3,338,379, Aug. 29, 1967, Rees, Example 1) as represented by such commercially available materials as Surlyn A1555 (trademark), specific gravity .93–.96. Lubricant type III may be a thermoplastic polyurethane (e.g., 90 Shore A hardness), such as polytetramethyleneglycoldiphenylmethanediisocyanate - 1,4 - butane diol polyurethane (e.g., U.S. Pat. 2,899,411, Aug. 11, 1959, Schollenberger, Example 1) as represented by such commercially available materials as "Estane 5701" (trademark) or the like. Lubricant type IV may be polyethylene glycol of 4000 molecular weight, e.g., "Carbowax 4000" (trademark). Lubricant V may be oleic acid or other higher fatty acid. The materials of Table IV may be charged to a Banbury which has been preheated to 240° F. and mixed for 3 minutes; attaining a maximum processing temperature of 360° F. Each batch was discharged, sheeted on a mill, chopped and tested with the results indicated in Table IV. The extrudability was evaluated both by extrusion of ⅛ inch rod from the Braebender, and also by extrusion of a 1 and ¼ by 25/1000 inch strip from a Davis Standard extruder (Model 15 T, Ser. No. E2981), rear temperature 370°, 400°, 425° F.; front 450° F.; throat 450° F.; die, 450° F.; screw compression ratio, 2.5/1; screw speed 10 r.p.m.; screen pack, 60, 100, 100 mesh. Comparison of Run 26 (no lubricant), Table IV with the "Base Polymer" Run 25, Table V shows that the additional shearing in Run 26 did improve the extrusion, even without lubricant, but at the expense of a decrease in performance factor. The lubricants, in Runs 27–32, optimized the extrusion characteristics, and physical properties were enhanced or substantially retained.

TABLE III—BASE POLYMER

| Ingredients (parts) | Run 25 |
|---|---|
| EPDM I | 80 |
| Polypropylene I | 20 |
| Peroxide I | 0.5 |
| Processing temp., °F. | 350–400 |
| Processing period, minutes | 13 |
| Gel, percent | 87 |
| Swell, percent | 6 |
| ML-5-350° F. | 32 |
| Tensile strength, p.s.i. | 1070 |
| 100% modulus, p.s.i. | 710 |
| Elongation, percent | 220 |
| Elongation set at break, percent | 23 |
| Hardness, Shore A | 72 |
| Performance factor, p.s.i.×10³ | 10.2 |
| Extrusion smoothness (⅛ inch rod) | 8 |

TABLE IV

| Run number | 26 | 27 | 28 | 29 | 30 | 31 | 32 |
|---|---|---|---|---|---|---|---|
| Base polymer, parts | 100 | 100 | 100 | 100 | 100 | 100 | 100 |
| Lubricant, type | | I | II | III | III | IV | V |
| Lubricant, parts | | 1.0 | 1.0 | .5 | 1.0 | 1.0 | 1.0 |
| Processing temp., °F. max | 360 | 360 | 360 | 360 | 360 | 360 | 360 |
| Processing period, minutes | 3 | 3 | 3 | 3 | 3 | 3 | 3 |
| Gel, percent | 84 | 85 | 85 | 87 | 87 | 87 | 84 |
| Swell, percent | 6 | 6 | 7 | 6 | 6 | 6 | 7 |
| Tensile strength, p.s.i. | 810 | 850 | 920 | 920 | 890 | 830 | 860 |
| 100% modulus, p.s.i. | 570 | 600 | 640 | 550 | 650 | 590 | 600 |
| Elongation, percent | 210 | 230 | 210 | 220 | 230 | 220 | 220 |
| Elongation set at break, percent | 23 | 15 | 18 | 21 | 23 | 20 | 20 |
| Hardness, Shore A | 73 | 74 | 73 | 73 | 73 | 72 | 72 |
| Performance factor, p.s.i×10³ | 7.8 | 13.0 | 10.7 | 9.6 | 8.9 | 9.0 | 9.4 |
| Extrusion smoothness, ⅛″ rod Braebender | 9 | 10 | 10 | | 9 | 10 | 10 |
| Extrusion smoothness, 1×¼″ Davis | 9 | 8 | 10 | 10 | 10 | 10 | 10 |

EXAMPLE 4

This example further illustrates the practice of the invention. The materials shown in Table V are charged to a cold Banbury. Within 2½ minutes of mixing a processing temperature of about 370° is reached, at which temperature semicuring with shearing is continued for 4 minutes. Mixing is then stopped and 1 part of antioxidant (dilaurylthiodipropionate) is added. Shearing is then resumed and continued for one more minute at a processing temperature of 370° F. The dynamically semicured blends are discharged from the mixer, sheeted on a mill at 275° F. chopped and tested, with the results shown in Table V.

TABLE V

| Run number | 33 | 34 | 35 | 36 | 37 | 38 |
|---|---|---|---|---|---|---|
| EPDM I | 80 | 70 | 60 | 80 | 70 | 60 |
| Polypropylene I | 20 | 30 | 40 | | | |
| H.D. polyethylene | | | | 20 | 30 | 40 |
| Peroxide I | .6 | .6 | .6 | .6 | .6 | .6 |
| Processing temp., °F | 370 | 370 | 370 | 370 | 370 | 370 |
| Processing time, minutes | 7 | 7 | 7 | 7 | 7 | 7 |
| Gel, percent | 83 | 89 | 90 | 86 | 92 | 93 |
| Swell, percent | 8 | 6 | 4 | 5 | 5 | 4 |
| Tensile strength, p.s.i. | 1,050 | 1,380 | 1,590 | 1,390 | 1,900 | 2,000 |
| 100% modulus, p.s.i. | 810 | 950 | 1,100 | 1,190 | 1,800 | 1,990 |
| Elongation, percent | 240 | 340 | 450 | 140 | 110 | 130 |
| Elongation set at break, percent | 21 | 65 | 160 | 8 | 5 | 20 |
| Hardness, Shore A | 77 | 85 | 92 | 77 | 85 | 90 |
| Performance factor, p.s.i.×10³ | 12 | 7.3 | 4.5 | 24.5 | 26.2 | 13.0 |
| Extruded smoothness (Braebender) | 9 | 9 | 10 | 8 | 8 | 9 |

EXAMPLE 5

This example illustrates the fact that dynamic semicure, that is semicure accomplished while the blend is being sheared or masticated, as opposed to static semicure accomplished without dynamic working of the blend, is an important feature of the invention.

In the first run, Run 39 Table VI, dynamic partial cure of the blend is undertaken in accordance with the invention as follows:

80 parts of EPDM I, 20 parts of Polypropylene I, and .6 parts of Peroxide I are added to a Banbury which has been heated to 240° F. Mixing is started and within 1½ minutes a processing temperature of 360° F. has been reached. This processing temperature is maintained while continuing the mastication for 7 minutes. Mastication is then stopped, 1 part of dilaurylthiodipropionate is added, and then mastication is continued for 2 more minutes at a processing temperature of 360° F. Samples are sheeted, chopped and tested as before with the results shown in Table VI, Run 39.

For comparison a static semicure (Run 40 of Table VI, which is outside the invention) is undertaken as follows:

80 parts of EPDM I and 20 parts of Polypropylene I are mixed in a Banbury (without peroxide) for 7 minutes at 360° F., then the blend is cooled on a 250° F. mill. While milling at 275° F. .6 part of Peroxide I is added and thoroughly dispersed. The material is sheeted off, and strips are statically semi-cured in an oven by heating to 400° F. over a period of 5 minutes and then heating to 400° F. for 7 minutes. The properties of the resulting statically partially cross-linked blend are as shown in Table VI, Run 40.

TABLE VI

| Run | 39 | 40 |
|---|---|---|
| Tensile strength, p.s.i. | 1,040 | 610 |
| 100% modulus, p.s.i. | 810 | 600 |
| Elongation, percent | 230 | 150 |
| Elongation set at break, percent | 21 | 25 |
| Hardness, Shore A | 77 | 75 |
| Performance factor, p.s.i.×10³ | 11.5 | 3.7 |
| Gel, percent | 83 | 61 |
| Swell, percent | 8 | 10 |
| Extrusion smoothness | 9 | 3 |

Although the gel and swell values of the statically semi-cured material (Run 40) fall well within the desirable range, the physical properties in no way compare with those of the dynamically treated blend (Run 39). In spite of the fact that the same curative, curative level and, for practical purposes, the same curing time and temperatures were employed, the performance of the dynamically semi-cured blend unexpectedly shows considerable advantage.

EXAMPLE 6

Table VII compares results obtained with EPDM I against those obtained with a saturated EPM binary copolymer rubber (E:P ratio 50:50; Mooney viscosity 60 at 210° F.).

TABLE VII

| Run | 41 | 42 |
|---|---|---|
| Ingredients (parts): | | |
| EPDM I | 80 | |
| EPM | | 80 |
| Polypropylene I | 20 | 20 |
| Peroxide I | .6 | .6 |
| Processing temp., ° F. | 380 | 380 |
| Processing period, minutes | 7 | 7 |
| Tensile strength, p.s.i. | 1,050 | 290 |
| 100% modulus, p.s.i. | 800 | 50 |
| Elongation, percent | 150 | 210 |
| Elongation set at break, percent | 15 | 90 |
| Hardness, Shore A | 79 | 65 |

Having thus described my invention, what I claim and desire to protect by Letters Patent is:

1. A method of making a thermoplastic blend comprising mixing monoolefin copolymer rubber, polyolefin plastic and a curative therefor, and masticating and shearing said materials at curing temperature to produce a partial cure insufficient to render the blend unprocessable, the amount of the said monoolefin copolymer rubber being from 50 to 90 parts by weight and the amount of the said polyolefin plastic being correspondingly from 50 to 10 parts by weight, the said monoolefin copolymer rubber being a copolymer of at least two different monoolefins, one of which is ethylene and the other or others being alpha-monoolefins of the formula $CH_2=CHR$ where R is an alkyl radical having 1 to 12 carbon atoms, with or without at least one copolymerizable polyene, the resulting partially cured blend having a gel content of from 60 to 93% by weight measured in cyclohexane at 73° F., the said blend being repeatedly reprocessable, and having the characteristics of a thermoplastic elastomer, whereby shaped articles having good physical properties may be made therefrom without requiring vulcanization.

2. A method as in claim 1 in which the said curative is an organic peroxide.

3. A method as in claim 2 in which the partially cured blend has a percent swell of from 2% to 15% measured in cyclohexane at 73° F.

4. A method as in claim 2 in which the said monoolefin copolymer rubber is ethylene-propylene-non-conjugated diene terpolymer, and the percent swell of the partially cured blend is from 2% to 10%, measured in cyclohexane at 73° F.

5. A method of making a thermoplastic elastomeric blend comprising dynamically working and shearing from 60 to 80 parts by weight of a rubbery copolymer of at least two different alpha-monoolefins, one of which is ethylene, with at least one copolymerizable polyene, in admixture with correspondingly 40 to 20 parts by weight of a polyolefin resin selected from the group consisting of polyethylene and polypropylene, at a temperature of from 160° F. to 550° F. in the presence of a curative for from 3 to 20 minutes to produce a gel content in the blend of from 60 to 93% measured in cyclohexane at 73° F., the partial cure thus imparted to the blend being insufficient to render the blend unprocessable.

6. A method of making a processable, thermoplastic elastomer comprising masticating at a temperature of from 270° to 450° F. for a period of 3–20 minutes a blend of 50 to 90 parts by weight of an ethylene-propylene-non-conjugated diene copolymer rubber with correspondingly from 50 to 10 parts by weight of polyethylene or polypropylene, in the presence of insufficient peroxide curative to cure the blend to the extent that it becomes unprocessable but sufficient to produce a gel content in the thus-processed mixture of from 60 to 93% by weight measured in cyclohexane at 73° F., said gel content being at least 10% greater than the gel content of the mixture similarly processed in the absence of said curative.

7. A method as in claim 6 in which, after masticating the said materials to produce the said gel content, there is added to the mixture a free-radical scavenging agent in amount sufficient to inactivate any residual peroxide curative.

8. A method of making a thermoplastic elastomer capable of being shaped into articles displaying low permanent set without curing the articles, comprising semicuring a blend of from 50 to 90 parts by weight of ethylene-propylene-nonconjugated diene terpolymer rubber, and correspondingly from 50 to 10 parts by weight, of polyethylene resin or polypropylene resin, said semicure being effected dynamically by masticating said blend with insufficient curative to cure said blend to the extent that it becomes unprocessable and incapable of forming a coherent sheet on a mill but sufficient to increase the gel content by at least 20% by weight, the final gel content being from 60 to 93% by weight, measured in cyclohexane at 73° F., the resulting dynamically semicured blend being a processable material.

9. A method as in claim 8 in which the said curative is an organic peroxide and the said resin is polypropylene.

10. A method as in claim 8 in which the semicure is carried out at a temperature at least as high as the activation temperature of the peroxide curative, for a time equal to at least four half-lives for the curative.

11. A method as in claim 10 in which a free-radical scavenger is added at the conclusion of the semicure.

12. A method of making a thermoplastic elastomer comprising dynamically mixing and shearing in an internal mixer at a temperature of 270–450° F. from 50 to 80 parts by weight of ethylene-propylene-dicyclopentadiene terpolymer and correspondingly from 50 to 10 parts by weight of polypropylene resin, in the presence of insufficient peroxide curvative to cure the mixture to the extent that it becomes unprocessable but sufficient to increase the gel content of the mix by at least 20% by weight and to decrease the percent swell of the mix by at least 10%, the final gel content being from 60 to 93% by weight, measured in cyclohexane at 73° F., the thus semicured mixture being a thermoplastic processable material capable of being shaped into elastomeric articles having low permanent set without vulcanization.

13. A method as in claim 12 in which as a result of the semicure the performance factor of the mixture is at least 20% higher than that of an otherwise similar mixture not semicured, wherein the performance factor, P.F., is given by the expression:

$$\text{P.F., p.s.i.} \times 10^3 = \frac{(\text{Tensile strength, p.s.i.}) \times (\text{Elongation at break, percent})}{\text{Elongation set at break, percent}}$$

References Cited

UNITED STATES PATENTS

| | | | |
|---|---|---|---|
| 3,256,366 | 6/1966 | Corbelli | 260—897 |
| 3,218,373 | 11/1965 | Salyer | 260—878 |
| 3,564,080 | 2/1971 | Pedretti et al. | 260—897 |
| 3,203,937 | 8/1965 | Breslow et al. | 260—79.3 |

FOREIGN PATENTS

| | | | |
|---|---|---|---|
| 1,043,078 | 9/1966 | Great Britain | 260—897 |
| 798,416 | 11/1968 | Canada | 260—897 |

JOHN C. BLEUTGE, Primary Examiner

C. J. SECCURO, Assistant Examiner

U.S. Cl. X.R.

260—23 H, 28.5 A, 41 R, 41 A, 41 B, 45.9 R, 45.95, 45.85, 859 R, 897 B

PO-1050
(5/69)

UNITED STATES PATENT OFFICE
CERTIFICATE OF CORRECTION

Patent No. 3,806,558     Dated April 23, 1974

Inventor(s)     William K. Fischer

It is certified that error appears in the above-identified patent and that said Letters Patent are hereby corrected as shown below:

Column 2, line 39, after the close quotation mark (") and before "it" insert a close parenthesis mark --)--.

Column 15, line 5, change "80" to --90--.

Signed and sealed this 12th day of November 1974.

(SEAL)
Attest:

McCOY M. GIBSON JR.
Attesting Officer

C. MARSHALL DANN
Commissioner of Patents